US008994655B2

(12) United States Patent
Komeda et al.

(10) Patent No.: US 8,994,655 B2
(45) Date of Patent: Mar. 31, 2015

(54) DISPLAY CONTROL DEVICE COMPRISING PROCESSING UNIT FOR DRAWING POINTER AND CONTROL SYSTEM

(75) Inventors: Munehiro Komeda, Tokyo (JP); Takahiro Katoji, Tokyo (JP); Toshiaki Otaka, Tokyo (JP); Motofumi Naruto, Aichi (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 693 days.

(21) Appl. No.: 13/053,475

(22) Filed: Mar. 22, 2011

(65) Prior Publication Data

US 2012/0242574 A1 Sep. 27, 2012

(51) Int. Cl.
| G06F 3/033 | (2013.01) |
| G09G 5/08 | (2006.01) |
| G09G 5/36 | (2006.01) |
| G06F 3/14 | (2006.01) |
| G09G 5/14 | (2006.01) |
| G06F 3/038 | (2013.01) |

(52) U.S. Cl.
CPC .. G09G 5/08 (2013.01); *G06F 3/14* (2013.01); *G09G 5/14* (2013.01); G09G 5/36 (2013.01); *G09G 2340/12* (2013.01); *G09G 2360/06* (2013.01); *G06F 3/0383* (2013.01)
USPC .......................................................... 345/157

(58) Field of Classification Search
CPC ...................................................... G06F 3/033
USPC .......................................................... 345/157
See application file for complete search history.

(56) References Cited

U.S. PATENT DOCUMENTS

| 5,548,304 A | * | 8/1996 | Yoshino et al. | 345/157 |
| 5,581,670 A | * | 12/1996 | Bier et al. | 715/856 |
| 5,654,726 A | * | 8/1997 | Mima et al. | 345/2.2 |
| 5,699,534 A | * | 12/1997 | Barber et al. | 715/856 |
| 5,777,615 A | * | 7/1998 | Barber et al. | 715/856 |
| 5,900,869 A | * | 5/1999 | Higashio | 715/751 |

(Continued)

FOREIGN PATENT DOCUMENTS

| JP | 3-119478 | 5/1991 |
| JP | 4-280294 | 10/1992 |
| JP | 2000-181846 | 6/2000 |

OTHER PUBLICATIONS

Japanese Office Action issued Nov. 6, 2012 in corresponding Japanese Patent Application No. 2009-282092 with English translation.

(Continued)

*Primary Examiner* — Claire X Pappas
*Assistant Examiner* — Robert Stone
(74) *Attorney, Agent, or Firm* — Wenderoth, Lind & Ponack, LLP

(57) ABSTRACT

The prompt responsiveness and operability of pointer display and pointer control is ensured. A display control device has: a first information processing terminal drawing a pointer corresponding to each of input operation devices on a pointer screen on the basis of an operation quantity input from each of the input operation devices; a second information processing terminal drawing a working state of an application on an application screen in accordance with the input instruction information input from each of the input operation devices; and an image synthesis unit that creates a synthesized image by superimposing each of the two screens on the other and that outputs the image to a display device.

14 Claims, 14 Drawing Sheets

(56) References Cited

U.S. PATENT DOCUMENTS

| | | | |
|---|---|---|---|
| 2002/0059308 A1* | 5/2002 | Kawashima et al. | 707/200 |
| 2002/0149617 A1* | 10/2002 | Becker | 345/751 |
| 2003/0006961 A1* | 1/2003 | Shipilevsky | 345/157 |
| 2003/0076363 A1* | 4/2003 | Murphy | 345/800 |
| 2007/0031121 A1* | 2/2007 | Ando et al. | 386/95 |
| 2007/0109287 A1* | 5/2007 | Matsubara et al. | 345/204 |
| 2008/0201644 A1* | 8/2008 | Partani et al. | 715/740 |
| 2009/0210817 A1* | 8/2009 | Schmieder et al. | 715/781 |

OTHER PUBLICATIONS

Japanese Decision to Grant a Patent issued Jan. 7, 2014 in Japanese Patent Application No. 2009-282092.

* cited by examiner

FIG. 9

| TERMINAL No. | POINTER No. | CORRESPONDING APPLICATION | APPLICATION WINDOW COORDINATES | APPLICATION WINDOW WIDTH |
|---|---|---|---|---|
| 1 | POINTER A | APPLICATION α | (xa1, ya1) | (Wx1, Wy1) |
| 2 | POINTER B | APPLICATION β | (xa2, ya2) | (Wx2, Wy2) |
| 3 | POINTER C | NO ALLOCATION | - | - |
| 4 | NO ALLOCATION | NO ALLOCATION | - | - |
| 5 | NO ALLOCATION | NO ALLOCATION | - | - |

FIG. 10A

| POINTER No. | POINTER COORDINATES |
|---|---|
| POINTER A | (xp1, yp1) |
| POINTER B | (xp2, yp2) |
| | |

FIG. 10B

| POINTER No. | POINTER COORDINATES |
|---|---|
| POINTER A | (xp1+$\Delta$x, yp1+$\Delta$y) |
| POINTER B | (xp2, yp2) |
| | |

FIG. 13

| TERMINAL No. | POINTER No. | CORRESPONDING APPLICATION | APPLICATION WINDOW COORDINATES | APPLICATION WINDOW WIDTH |
|---|---|---|---|---|
| 1 | POINTER A | APPLICATION α | (xa1, ya1) | (Wx1, Wy1) |
| 2 | POINTER B | APPLICATION β | (xa2, ya2) | (Wx2, Wy2) |
| 3 | POINTER C | NO ALLOCATION | - | - |
| 4 | NO ALLOCATION | NO ALLOCATION | - | - |
| 5 | NO ALLOCATION | NO ALLOCATION | - | - |

FIG. 14

| POINTER No. | POINTER COORDINATES |
|---|---|
| POINTER A | (xp1, yp1) |
| POINTER B | (xp2, yp2) |

DISPLAY CONTROL DEVICE COMPRISING PROCESSING UNIT FOR DRAWING POINTER AND CONTROL SYSTEM

CROSS-REFERENCE TO RELATED APPLICATIONS

This application is based on Japanese Patent Application No. 2009-282092, the contents of which are incorporated herein by reference.

TECHNICAL FIELD

The present invention relates to a control system using, for example, a window system and particularly relates to a display control device capable of simultaneously controlling a plurality of pointers.

BACKGROUND ART

There are many applications which realize operation and display by utilizing a window system in order to realize a multi-window environment. The window system is a mechanism on a computer and software therefor which allocate unique regions (windows) respectively to a plurality of parallelly-operating tasks (applications) and multiplex screen output, and the window system is widely utilized today. In the window system, basically, the number of the pointer operable on one screen is one. For example, when a plurality of windows are displayed on a large screen and operated by a plurality of operators, a mechanism for carrying out simultaneous operation is required to be mounted separately from the window system.

For example, Patent Literature 1 discloses an electronic meeting system of a multi-window environment having information processing terminals and a shared screen display device which are connected with each other via a network. Patent Literature 1 discloses window controlling rights of the case in which windows on the shared screen display device are simultaneously operated by a plurality of operators by using respective operation terminals.

CITATION LIST

Patent Literature

{PTL 1}
Japanese Unexamined Patent Application, Publication No. 2000-181846

SUMMARY OF INVENTION

Technical Problem

Above described Patent Literature 1 does not show a specific method for carrying out pointer movement and window control in the case in which inputs from pointing devices of the plurality of operation terminals are transferred to the shared screen display device.

However, for example, according to the configuration of Patent Literature 1, a program which carries out pointer control and application programs are processed by a same information processing terminal, and the processing results thereof are configured to be displayed on the shared display device by, for example, a video card retained by the same information processing terminal.

Therefore, for example, when the application program which carries out window display displays many three-dimensional polygonal targets at a constant cycle, in other words, in the case of an application having a large display processing load such as state display of an airplane control device, there has been problems such as delay of pointer display and pointer control since the time consumed for processing of state display is long. Furthermore, there have been problems such as deterioration in the original real-time performance of the state display of the application due to increase in the load of pointer control.

The present invention has been accomplished in order to solve the above described problems, and it is an object of the present invention to provide a display control device capable of ensuring prompt responsiveness and operability of pointer display and pointer control even when applied to a window application which displays progressively-changing many targets three dimensionally like the state display of the control system and to provide a control system having the display control device.

Solution to Problem

In order to solve the above described problems, the present invention employs the following solutions.

The present invention provides a display control system connected to a plurality of input operation units via a network and adapted for moving a pointer displayed on a display unit on the basis of an operation quantity input from the input operation units and changing a working state of an application displayed on the display unit in accordance with input instruction information input from the input operation units, the display control system having: a first processing unit having a pointer screen corresponding to a display region of the display unit, the first processing unit drawing the pointer corresponding to each of the input operation units on the pointer screen on the basis of the operation quantity input from each of the input operation units; a second processing unit having an application screen corresponding to the display region of the display unit, the second processing unit drawing the working state of the application on the application screen in accordance with the input instruction information input from each of the input operation units; and an image synthesis unit that creates a synthesized image in which the pointer screen on which the pointer is drawn and the application screen on which the working state of the application is drawn are superimposed on each other and that outputs the synthesized image to the display unit.

The first processing unit which draws the pointer and the second processing unit which draws the working state of the application are provided in this manner. Therefore, the pointer control display and the working state display of the application can be realized by separate means, for example, by separate hardware units. The ability of processing can be improved by dividing the processes about the display and allocating them to separate processing units in this manner. Thus, the prompt responsiveness and operability can be improved. Moreover, since the screens created by the individual processing units are superimposed on each other by the image synthesis unit, a display image which is just like one that has undergone display control by a single processing unit can be displayed on the display unit.

The above described display control device may be configured so that: the first processing unit has a dominating-right table in which identification information of the input operation unit and identification information of the application for which the input operation unit has a dominating right are associated with each other; and, when the input instruction information about the application is received from the input operation unit, whether the input operation unit has the dominating right of the application or not is determined by referencing the dominating-right table, and, if the input operation unit has the dominating right, the identification information of the input operation unit, the identification information of the application, and the input instruction information about the application are associated with each other and are output to the second processing unit.

When the dominating-right table of the application is managed in this manner, one application can be prevented from being operated by a plurality of operators.

The above described display control device may be configured so that: the first processing unit has a moving-right table in which the identification information of the input operation unit and the identification information of the application for which the input operation unit has a moving right of a window are associated with each other; and, when operation information about movement of the window is received from the input operation unit, whether the input operation unit has the moving right of the window of the application or not is determined by referencing the moving-right table, and, if the input operation unit has the moving right of the window, the identification information of the input operation unit, the identification information of the application, and the movement operation information of the window are associated with each other and are output to the second processing unit.

When the moving-right table of the application window is managed in this manner, one application window can be prevented from being moved by a plurality of operators.

The above described display control device may be configured so that: the input operation unit different from the input operation unit having the dominating right of the application can acquire the moving right of the window of the application.

As a result, for example, the window about the application dominated by any of the input operation units can be moved on the basis of a movement order from the other input operation units.

The present invention provides a control system having: a plurality of input operation units; the display control device of any of the above described aspects connected to the plurality of input operation units via a network; and a display unit displaying an image signal output from the display control device.

Advantageous Effects of Invention

According to the present invention, the effects of ensuring the prompt responsiveness and operability of pointer display and pointer control are exerted even when applied to a window application which three-dimensionally displays many progressively-changing targets like the state display of an airplane control system.

BRIEF DESCRIPTION OF DRAWINGS

FIG. 9 is a drawing showing an example of a dominating-right table.

FIG. 10A is a drawing showing an example of a pointer display coordinate table before a pointer is moved.

FIG. 10B is a drawing showing an example of the pointer display coordinate table after the pointer is moved.

FIG. 13 is a drawing showing an example of the dominating-right table.

FIG. 14 is a drawing showing an example of the pointer display coordinate table.

DESCRIPTION OF EMBODIMENTS

Hereinafter, an embodiment of a display control device and a control system according to the present invention will be explained with reference to drawings.

Figure 1:
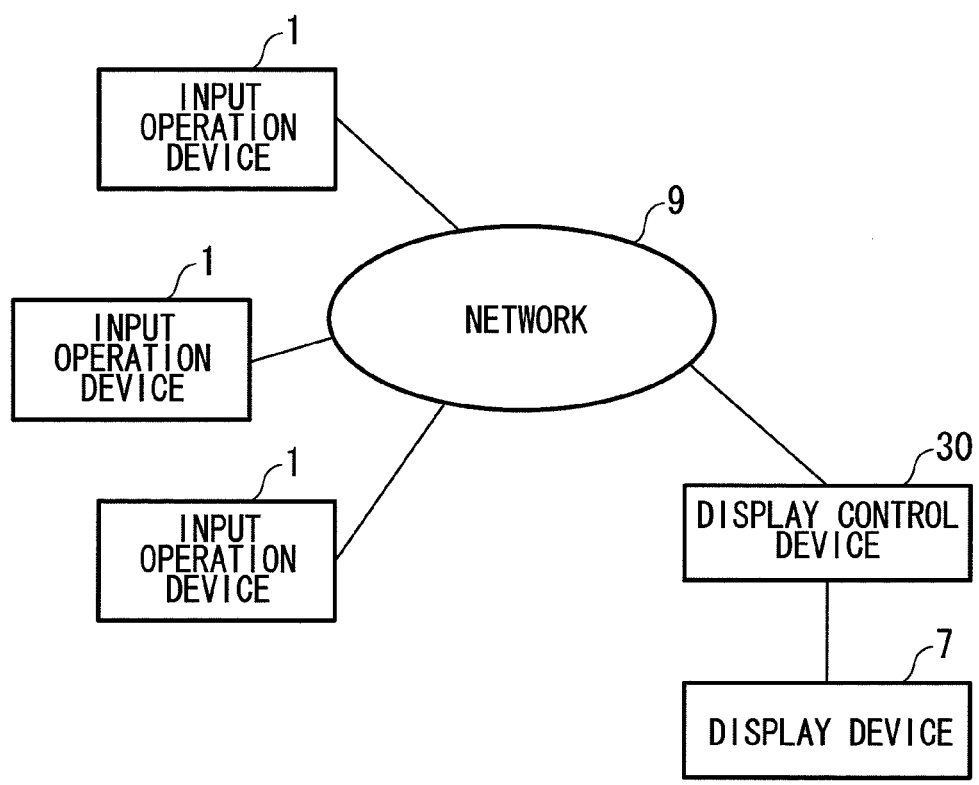
FIG. 1 is a block diagram showing a brief configuration of a control system according to the present embodiment.

FIG. 1 is a block diagram showing a brief configuration of the control system according to the present embodiment.

As shown in FIG. 1, the control system according to the present embodiment has: a plurality of input operation devices 1; the display control device 30 connected to the plurality of input operation devices 1 via a network Net 9; and a display device 7, which displays image signals output from the display control device 30.

The input operation devices 1 are the operation terminals by which operators carry out operations of pointers and operations of windows displayed on a large screen display of the display device 7, and, for example, the number of the prepared input operation devices corresponds to the number of the operators.

The display control device 30 moves the pointers, which are displayed on the display device 7, on the basis of the operation quantities input from each of the input operation devices 1 and changes the working states of applications, which are displayed on the display device 7, in accordance with input instruction information input from each of the input operation devices 1.

The display device 7 is a display device of, for example, liquid crystal, plasma, or rear projector and may be a single-screen display device or a display device forming one large screen by combining a plurality of display devices.

Figure 2:
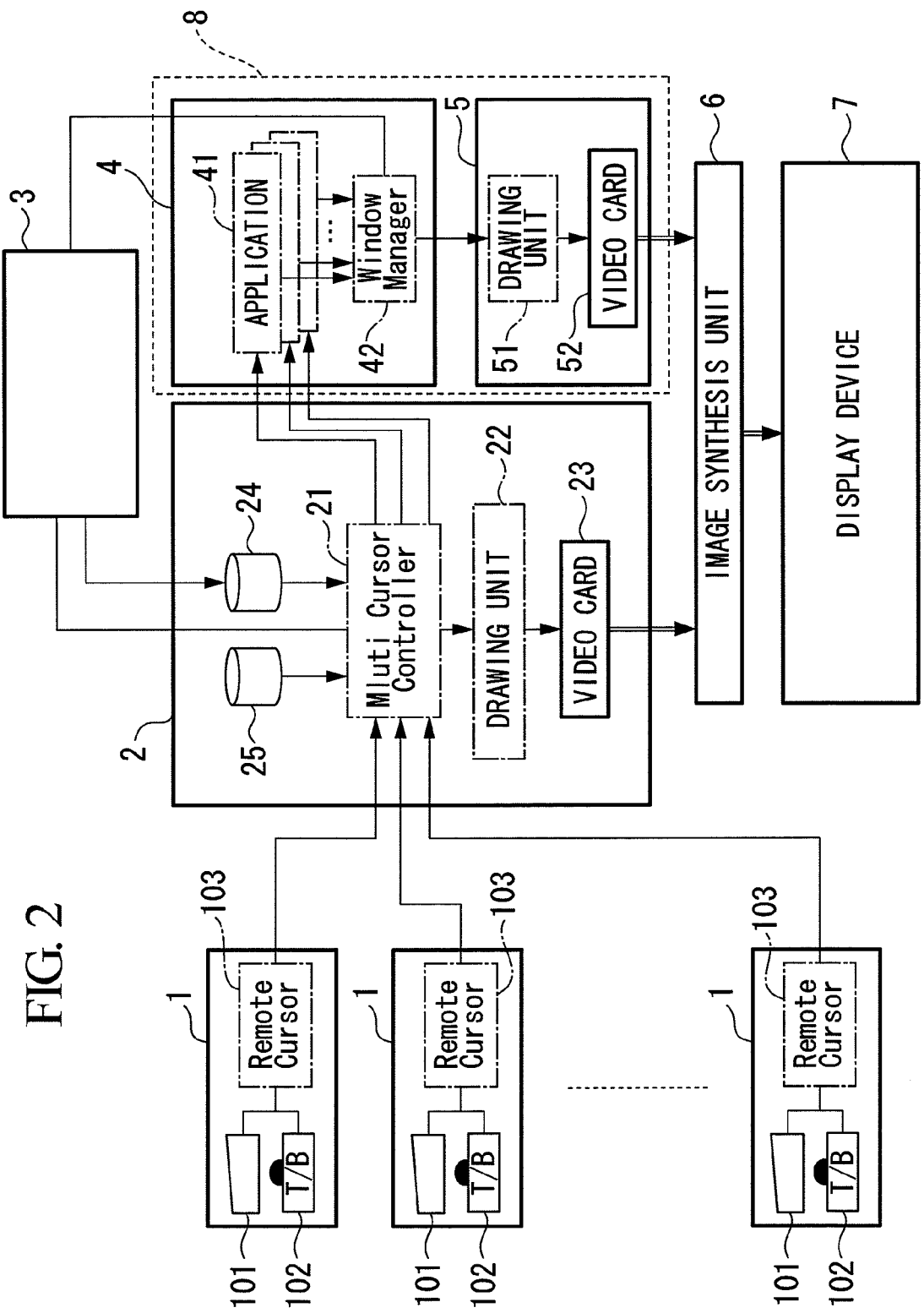
FIG. 2 is a diagram showing a further-detailed configuration of the control system shown in FIG. 1.

FIG. 2 is a diagram showing a further-detailed configuration of the control system shown in FIG. 1.

As shown in FIG. 2, the input operation device 1 is, for example, an information processing terminal and has a keyboard 101 and a pointing device 102 as input devices. The keyboard 101 is a device for carrying out operations such as input to the windows and carrying out input of activation or termination of the applications. The pointing device 102 is a device for carrying out pointer operations and operations with respect to the windows. The input information input from the keyboard 101 and the pointing device 102 is transmitted to a remote cursor 103, subjected to processing therein, and then output to the display control device 30.

The display control device 30 has, as main components: a first information processing terminal (first processing unit) 2, a second information processing terminal (second processing unit) 8, and an image synthesis unit 6.

The first information processing terminal 2 and the second information processing terminal 8 are so-called computers; and each of the information processing terminals is composed of, for example, a CPU (Central Processing Unit), a main storage device such as a RAM (Random Access Memory), an auxiliary storage device such as HDD (Hard Disk Drive), and a communication device which transmits/receives information by communicating with external devices.

Various programs (for example, application software) are stored in the auxiliary storage device. When the CPU reads the programs from the auxiliary storage device to the main storage device and executes the programs, various processes can be realized.

The first information processing terminal 2 has a pointer screen corresponding to the display screen region of, for example, the display device 7; and the first information processing terminal 2 draws on the pointer screen the pointers respectively corresponding to the input operation devices 1 on the basis of the operation quantities input from the input operation devices 1. Specifically, the first information processing terminal 2 calculates the display coordinates of the pointers on the pointer screen on the basis of the operation quantities input from the respective input operation devices 1 and draws the pointers at the corresponding display coordinates on the pointer screen. The pointer screen on which the pointers are drawn is converted to video signals and output to the image synthesis unit 6. For example, application software for displaying the pointers is installed in the first information processing terminal 2. The above described process is realized by executing this application software.

More specifically, the first information processing terminal 2 has: a multi cursor controller 21, a drawing unit 22, a video card 23, a dominating-right table 24, and a pointer display coordinate table 25.

The multi cursor controller 21 controls the movement of the pointers on the display screen of the display device 7 respectively for the input operation devices 1. Respectively for the applications controlled by the input operation devices 1, the multi cursor controller 21 also converts the input instruction information (for example, the input information of the keyboard 101, the button pressing information of the pointing device 102) to the information of interface specifications of a window system and outputs the information to the respective applications. Moreover, the multi cursor controller 21 determines whether the input instruction information input from the input operation device 1 is activation or termination of the application or not; and, if the information is activation or termination, the multi cursor controller 21 notifies a view manager 3 of the activation or termination of the application.

The drawing unit 22 draws the pointers at the corresponding display coordinates on the pointer screen. The video card 23 is a general video card equipped in an information processing terminal and converts the pointer screen to the video signals after the pointers are drawn thereon.

The dominating-right table 24 is a table retaining pointer information of the input operation devices 1 and the identification information of the applications for which dominating rights are owned, wherein both the information is associated with each other. In the dominating-right table, the display coordinates, size, etc. of the applications are recorded in association with the identification information of the applications.

The pointer display coordinate table 25 is a table retaining the identification information of the pointers and the current display coordinates thereof associated with each other.

The second information processing terminal 8 has an application screen corresponding to the display region of the display device 7, and the second information processing terminal 8 draws on the application screen the working states of the applications in accordance with the input instruction information input from the respective input operation devices 1. The size of the application screen is the same as the size of the above described pointer screen.

Specifically, the second information processing terminal 8 has a display controlling unit 4 and a display processing unit 5. In the present embodiment, each of the display controlling unit 4 and the display processing unit 5 is composed of independent hardware. However, instead of that, the units may be composed of common hardware.

The display controlling unit 4 has a plurality of application programs 41 and a window manager 42. The application programs 41 are application programs which are activated, controlled, and terminated in accordance with the input instruction information from the input operation devices 1. The window manager 42 is a program which controls window display of the plurality of application programs 41.

The display processing unit 5 carries out the process of displaying the applications operated in the display controlling unit 4, generates the application screen for display by the display device 7, converts the application screen to video signals, and outputs the signals to the image synthesis unit 6.

Specifically, the display processing unit 5 has a drawing unit 51 and a video card 52. The drawing unit 51 is a program which displays the information, specifically, the application windows output from the window manager 42 at the corresponding coordinates on the application screen. The video card 52 is a general video card equipped in an information processing terminal, as well as the video card 23.

The image synthesis unit 6 receives the pointer screen on which the pointers are drawn and the application screen on which the working states of the applications are drawn from the first information processing terminal 2 and the second information processing terminal 8, and the screens are superimposed on each other, thereby creating synthesized image data and outputting the synthesized image data to the display device 7. The image synthesis unit 6 is, for example, a generally-used video synthesis device.

The above described first information processing terminal 2 and the second information processing terminal 8 are connected to the view manager 3. The view manager 3 carries out control of the activation or termination of the applications with respect to the display controlling unit 4 on the basis of the activation or termination information of the applications input from the input operation devices 1 via the first information processing terminal 2, and the view manager 3 also obtains the coordinates of the windows and the size of the windows on the application screen and outputs them to the first information processing terminal 2.

In the display control device having the above described configuration, each of the part between the first information processing terminal 2 and the image synthesis unit 6, the part between the second information processing terminal 8 and the image synthesis unit 6, and the part between the image synthesis unit 6 and the display device 7 is connected by video signals such as DVI. The input operation devices 1, the first information processing terminal 2, the view manager unit 3, and the display controlling unit 4 are connected to each other via the network Net (see FIG. 1).

Moreover, in the present embodiment, the part between the display controlling unit 4 and the display processing unit 5 is also connected by a network. However, they are connected by a network separated from the above described network 9. This is for separating this network from the network 9 and ensuring display real-time performance in order to display, for example, the state display having a short display updating cycle, a large display information amount, and a large display processing load.

Next, the screens will be explained by using FIG. 3 to FIG. 5.

Figure 3:
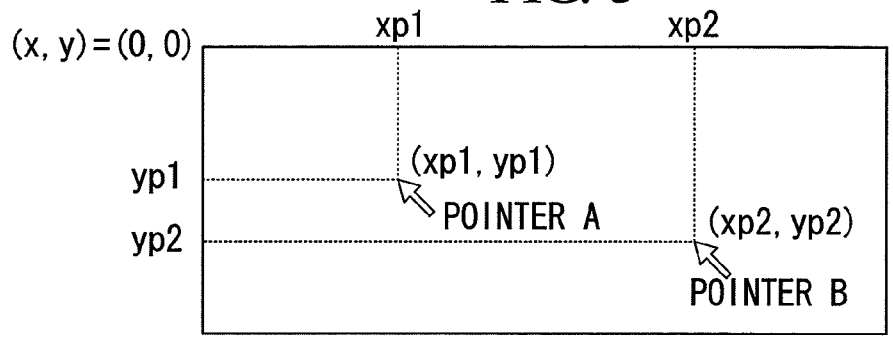
FIG. 3 is a drawing for explaining the brief overview of a pointer screen.
Figure 4:
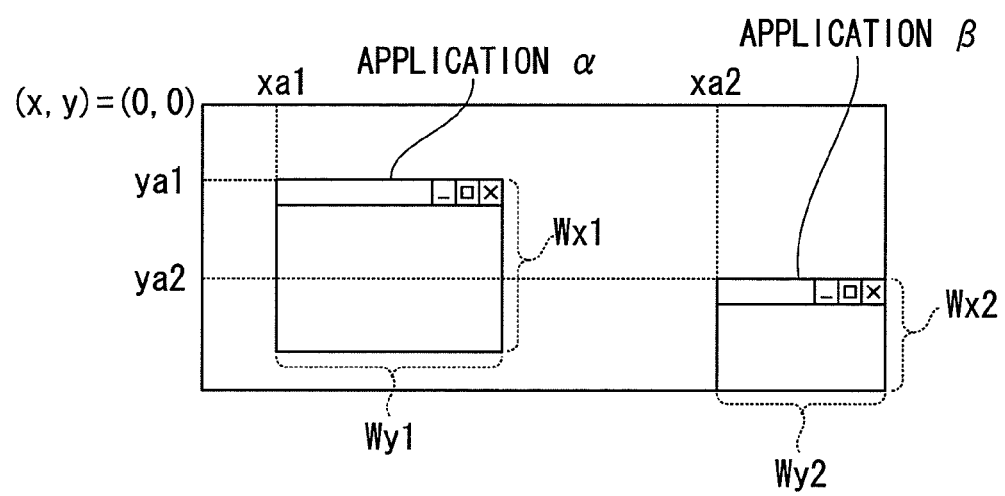
FIG. 4 is a drawing for explaining the brief overview of an application screen.
Figure 5:
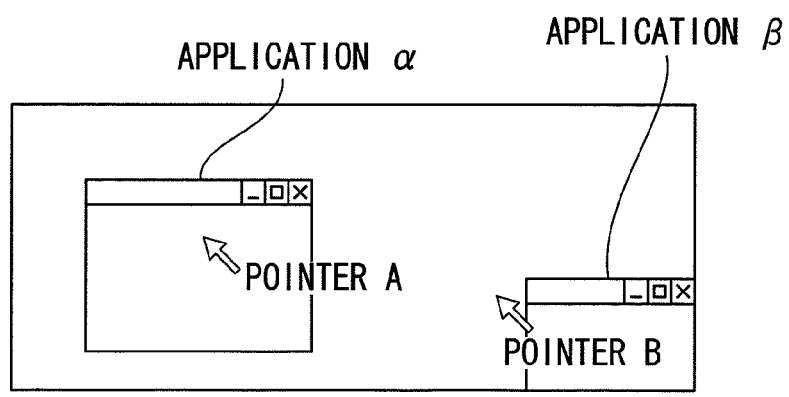
FIG. 5 is a drawing for explaining the brief overview of a synthesized screen in which the screen shown in FIG. 3 and the screen shown in FIG. 4 are superimposed on each other.

FIG. 3 is a drawing for explaining the brief overview of the pointer screen, FIG. 4 is a drawing for explaining the brief overview of the application screen, and FIG. 5 is a drawing for explaining the brief overview of the synthesized screen in which the two above described screens are superimposed on each other.

In both of the pointer screen shown in FIG. 3 and the application screen shown in FIG. 4, the top left of the screen is set to be the origin (0, 0) of coordinates, an x-axis is set in the horizontal direction from the top left, and a y-axis is set in the vertical direction from the left top. Specifically, the more distant from the top left of the screen toward the right, the more the x coordinate value is increased; and the more distant from the top left toward the bottom from the top left, the more the y coordinate axis value is increased.

The coordinate sizes (maximum x and y) of the pointer screen and the application screen are the same. When the screens are superimposed and displayed on the display device 7, the display of the same coordinates is superimposed at the same positions. The pointers are managed by the coordinates of the top left of the pointers. In the example of FIG. 3 to FIG. 5, the display position of a pointer A is expressed by the coordinates of (xp1, yp1), and the display position of a pointer B is expressed by the coordinates of (xp2, yp2).

The display positions of the application windows on the application screen are expressed by window positions (the top left coordinates of windows) and window sizes (widths in the x-axis and y-axis). In the example of FIG. 4, the window of an application α is expressed to have a window position of (xa1, ya1) and a window size of (Wx1, Wy1), and the window of an application β is expressed to have a window position of (xa2, ya2) and a window size of (Wx2, Yw2).

When the screens shown in FIG. 3 and FIG. 4 are superimposed with each other, the synthesized screen as shown in FIG. 5 is created.

Figure 6:
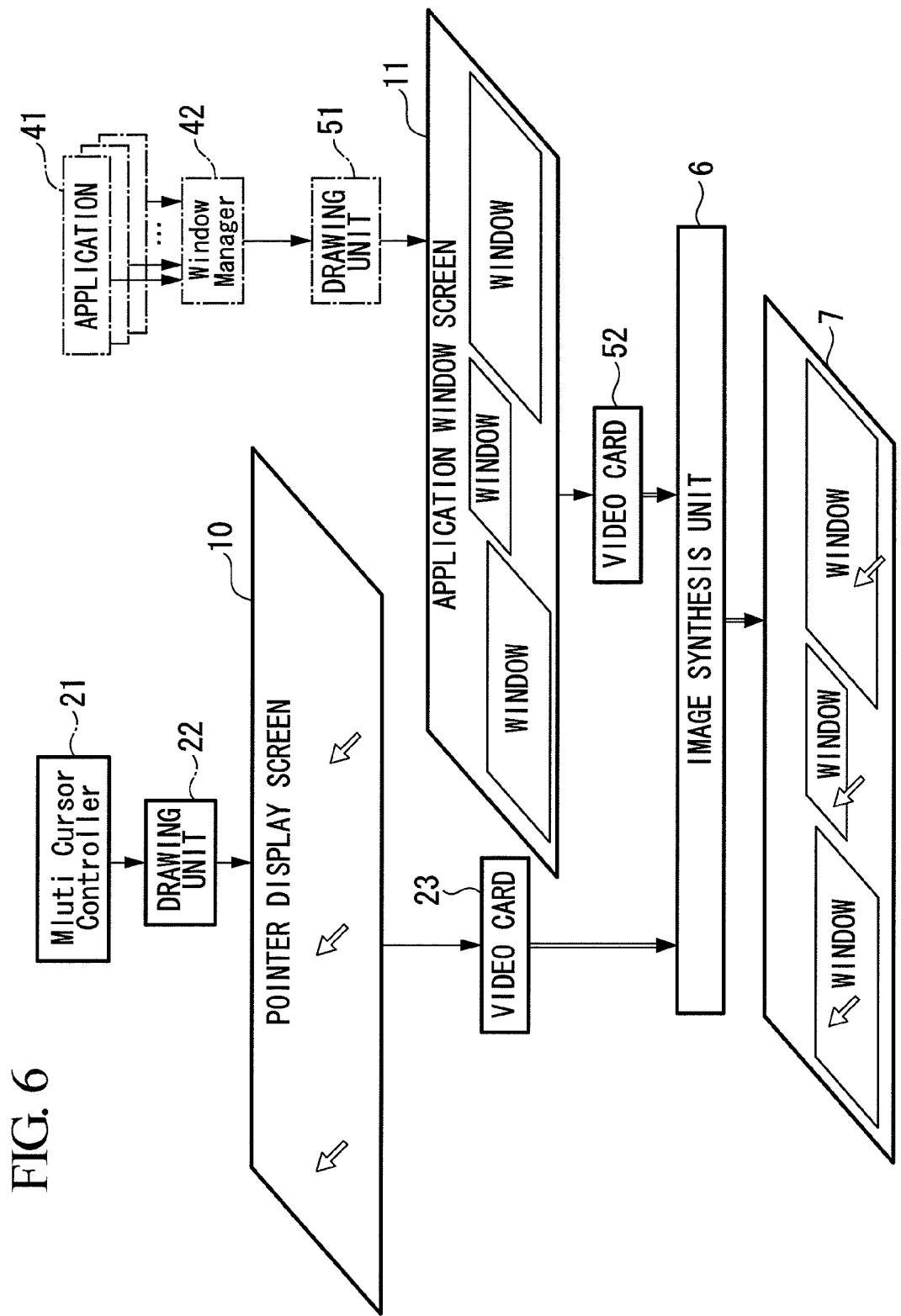
FIG. 6 is a drawing explaining working about display and a drawing schematically showing the mechanism in which the pointer screen and the application screen are synthesized on a display screen of a display device.

FIG. 6 is a drawing explaining working about display and a drawing schematically showing the mechanism in which the pointer screen (see FIG. 3) and the application screen (see FIG. 4) described above are synthesized on the display screen of the display device 7.

The display coordinates of the pointers in the pointer screen 10 are calculated by the multi cursor controller 21 on the basis of the operation quantities of the input operation devices 1, and the pointers are drawn at the display coordinates on the pointer screen 10 by the drawing unit 22. The pointer screen 10 after the pointer drawing is converted to video signals by the video card 23 and output to the image synthesis unit 6.

Similarly, in the application screen 11, the windows are drawn at the corresponding display coordinates on the application screen 11 through the processes of the application programs 41, the window manager 42, and the drawing unit 51. The application screen 11 after the window drawing is converted to video signals by the video card 52 and output to the image synthesis unit 6.

In the image synthesis unit 6, the pointer screen 10 and the application screen 11 input as the video signals are synthesized by superimposing the video signals thereof, and the video signals of the synthesized screen are output to the display device 7. As a result, on the large screen of the display device 7, the pointers and the application windows are displayed in the manner that they are superimposed on each other.

Figure 7:
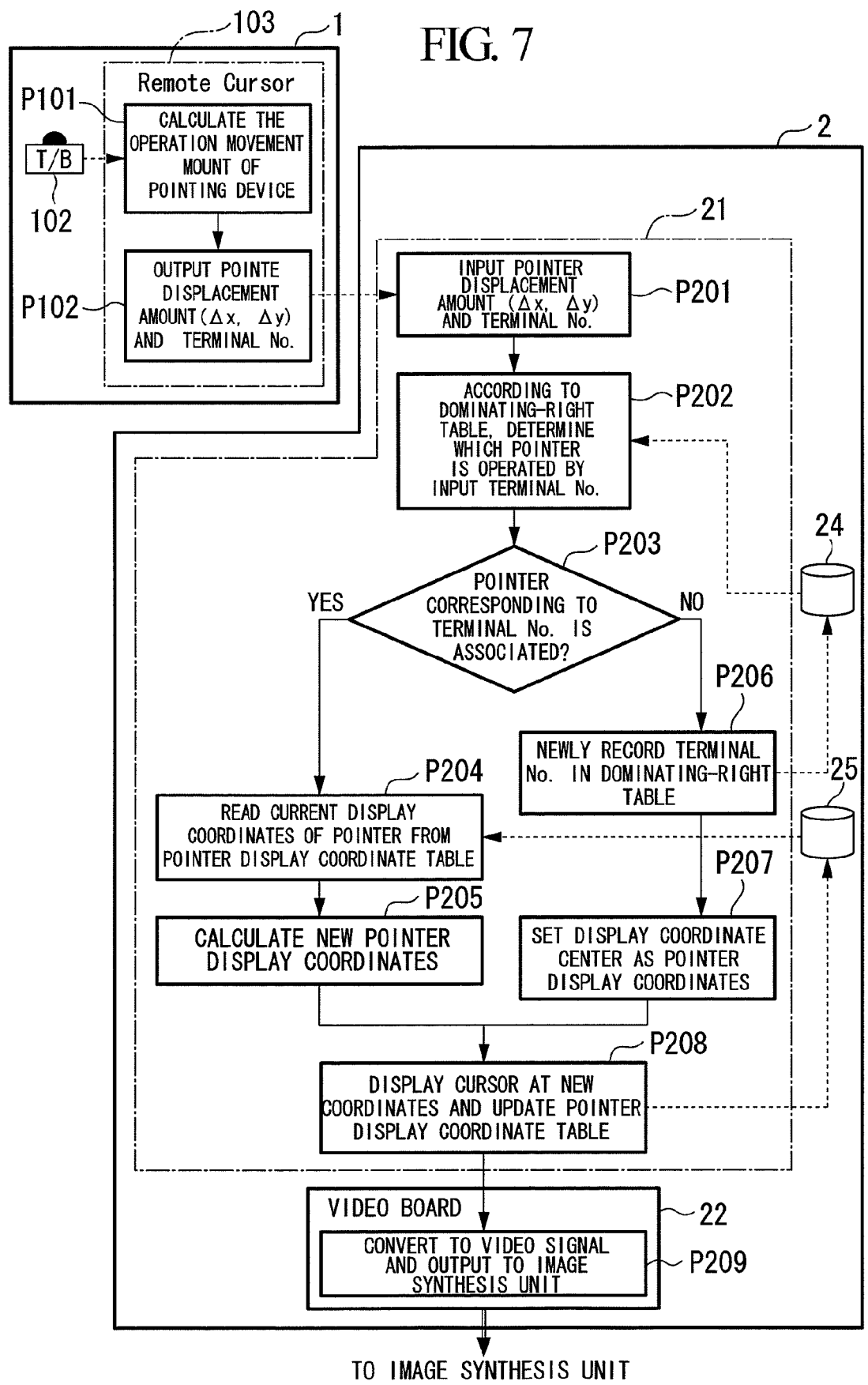
FIG. 7 is a working flow for explaining the working of pointer moving control.
Figure 8:
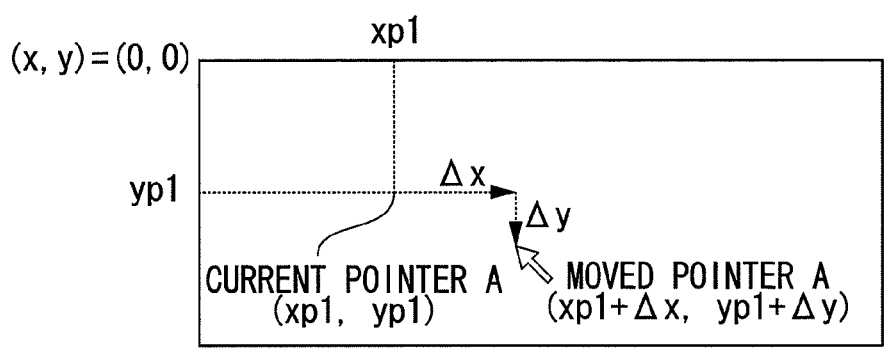
FIG. 8 is a drawing showing the idea of the pointer screen.

Next, a process procedure about a pointer operation of the display control device according to the present embodiment will be explained with reference to FIG. 7 to FIG. 10B. FIG. 7 is a working flow for explaining the working of pointer moving control. FIG. 8 is a drawing showing the idea of the pointer screen. FIG. 9 is a drawing showing an example of the dominating-right table 24. FIG. 10A is a drawing showing an example of the pointer display coordinate table 25 before a pointer is moved. FIG. 10B is a drawing showing an example of the pointer display coordinate table 25 after the pointer is moved.

In FIG. 7, when an operator moves the position of the pointing device 102 of the input operation device 1 while watching the pointer thereof displayed on the display device 7, the operation movement amount of the pointing device 102 is input to the remote cursor 103. The remote cursor 103 calculates a pointer displacement amount $\Delta x$, $\Delta y$ of the x-axis and the y-axis on the pointer screen on the basis of the operation movement amount (P101 of FIG. 7), attaches the identification information (for example, terminal No. 1) of the input operation device 1 to the calculated pointer displacement amount, and outputs them to the multi cursor controller 21 provided in the first information processing terminal 2 (P102 of FIG. 7).

When the multi cursor controller 21 receives the pointer displacement amount and the terminal No. 1 from the remote cursor 103 (P201), the multi cursor controller 21 references the dominating-right table 24 and determines which pointer is controlled by the input operation device 1 of the terminal No. 1 (P202, P203). For example, according to the dominating-right table shown in FIG. 9, it can be understood that the input operation device 1 of the terminal No. 1 controls a pointer A. Subsequently, the multi cursor controller 21 reads the current display coordinates of the pointer A from the pointer display table 25 (P204). Herein, as shown in FIG. 10A, the current display coordinates of the pointer A are (xp1, yp1).

Subsequently, the multi cursor controller 21 calculates the pointer coordinates of the movement destination from the pointer displacement amount $\Delta x$, $\Delta y$ previously obtained from the remote cursor 103 and the current display coordinates of the pointer A obtained from the pointer display coordinate table 25 (P205). As a result, the display coordinates of the pointer A after the movement are (xp1+$\Delta x$, yp1+$\Delta y$). The multi cursor controller 21 updates the pointer display coordinate table 25 as shown in FIG. 10B on the basis of the moved display coordinates and outputs the information of the display coordinates of the movement destination of the pointer A to the drawing unit 22 (P208). As a result, as shown in FIG. 8, a pointer screen on which the pointer A is drawn at the moved display coordinates is created, and the pointer screen is converted to video signals and output to the image synthesis unit 6 (P209). As a result, the position of the pointer A is moved on the display device 7.

In the above described explanation, the case in which the pointer A corresponding to the terminal No. 1 is already displayed on the display device 7 has been described. In other words, the case in which the pointer corresponding to the terminal No. 1 is recorded in the dominating-right table 24 has been explained. However, when the pointer number corresponding to the terminal No. 1 does not exist, in other words, when the pointer corresponding to the terminal No. 1 is not displayed on the display device 7 ("NO" in P203), the multi cursor controller 21 recognizes that the pointer display corresponding to the terminal No. 1 is new, attaches a not-currently-attached pointer number (for example, pointer D) to the terminal No. 1, and updates the dominating-right table (P206). Then, the multi cursor controller 2 sets the center coordinates of the screen as the display coordinates of the pointer, outputs the set center coordinates and the attached information of the pointer D to the drawing unit 22 (P207), and records the coordinates of the pointer and the pointer number in the pointer display table 25 in the manner that they are associated with each other (P208).

Figure 11:
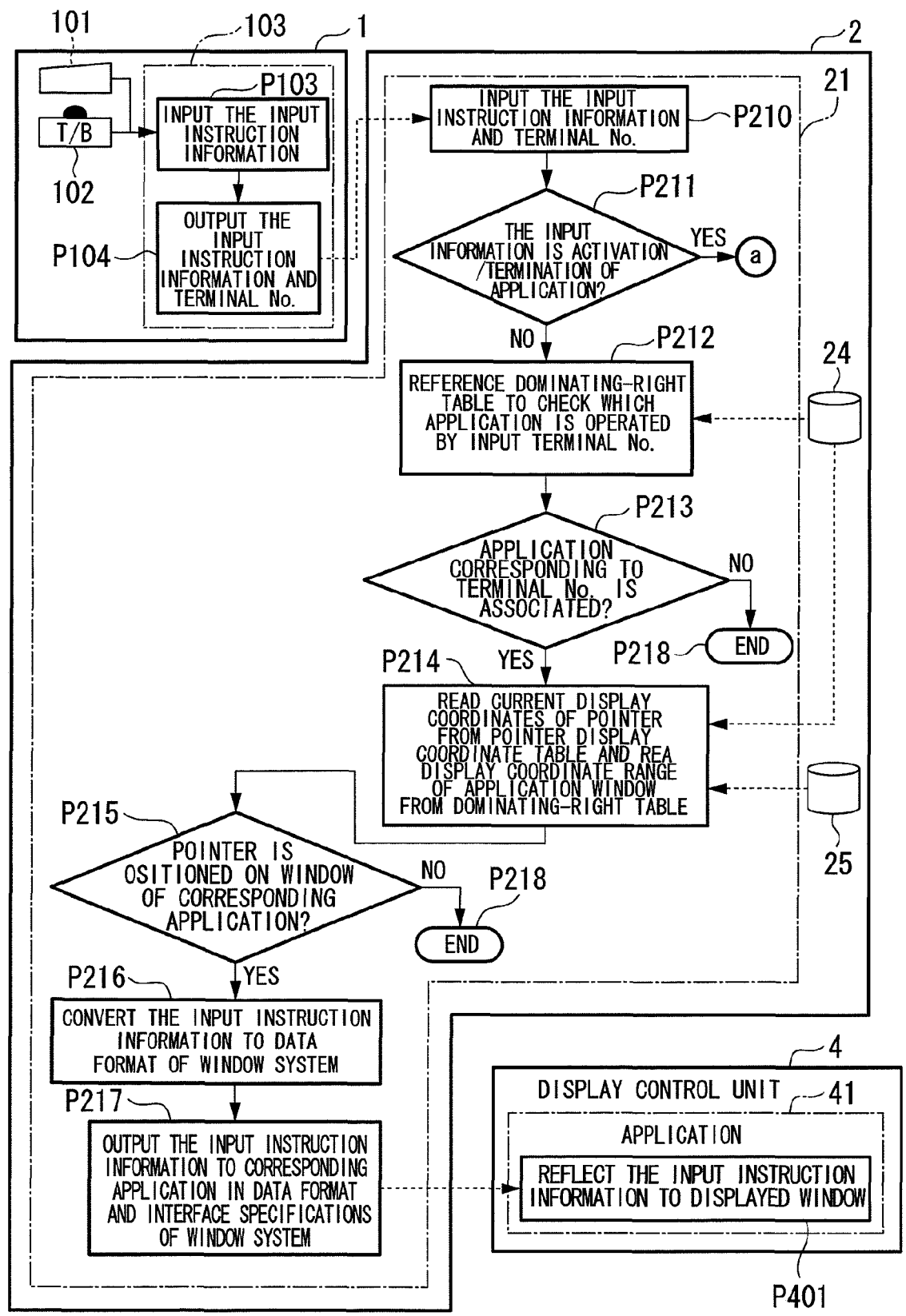
FIG. 11 is a working flow for explaining the process procedure about application state display.
Figure 12:
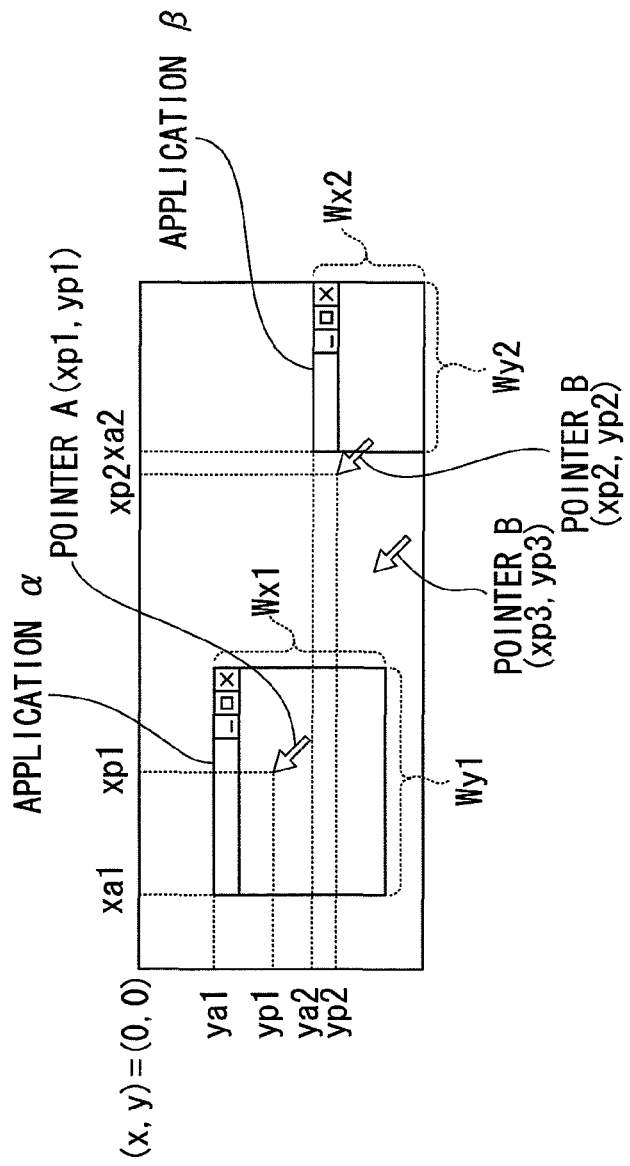
FIG. 12 is a drawing showing an example of the display screen of the display device.
Figure 15:
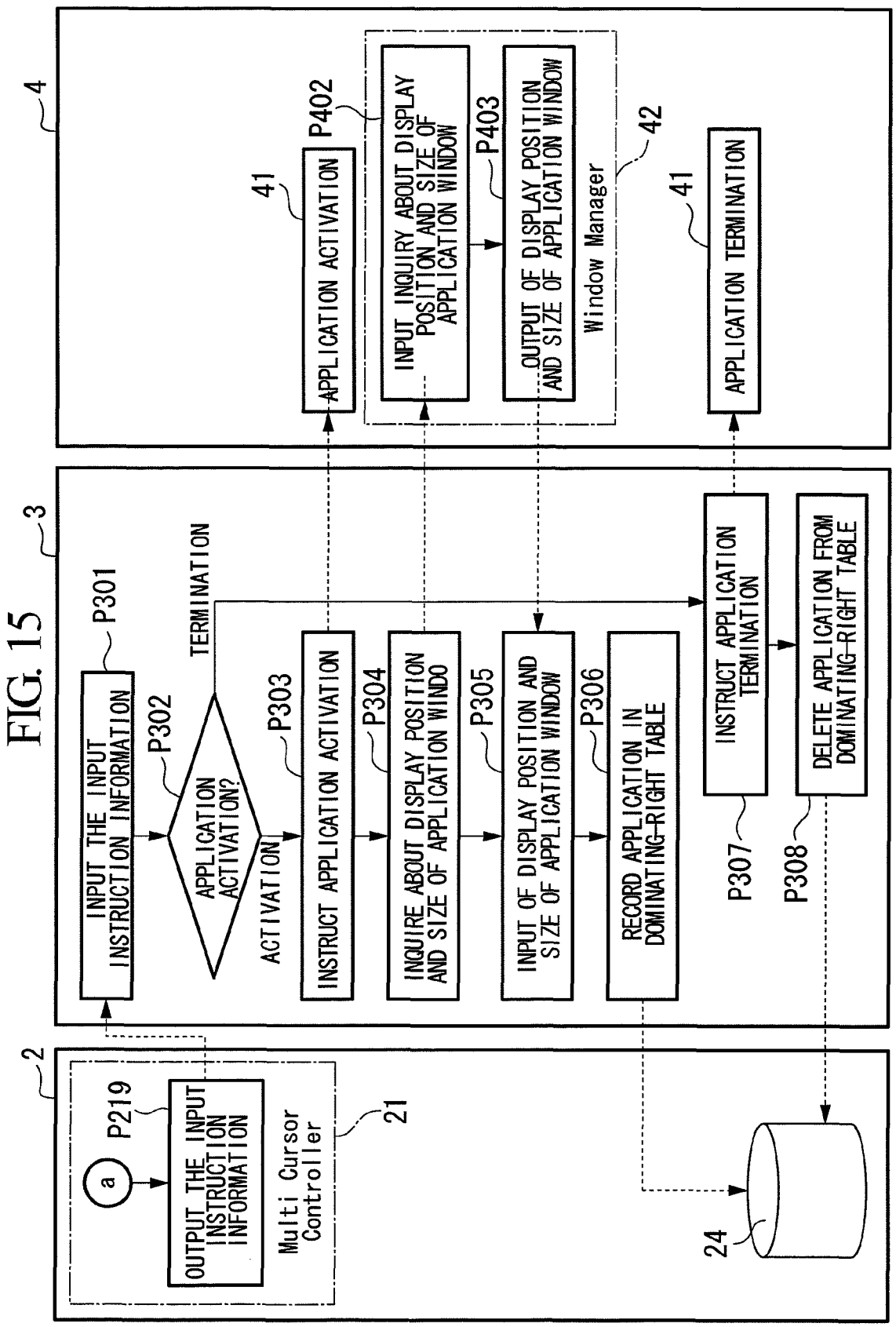
FIG. 15 is a drawing explaining the working of a view manager upon application activation or termination.
Figure 16:
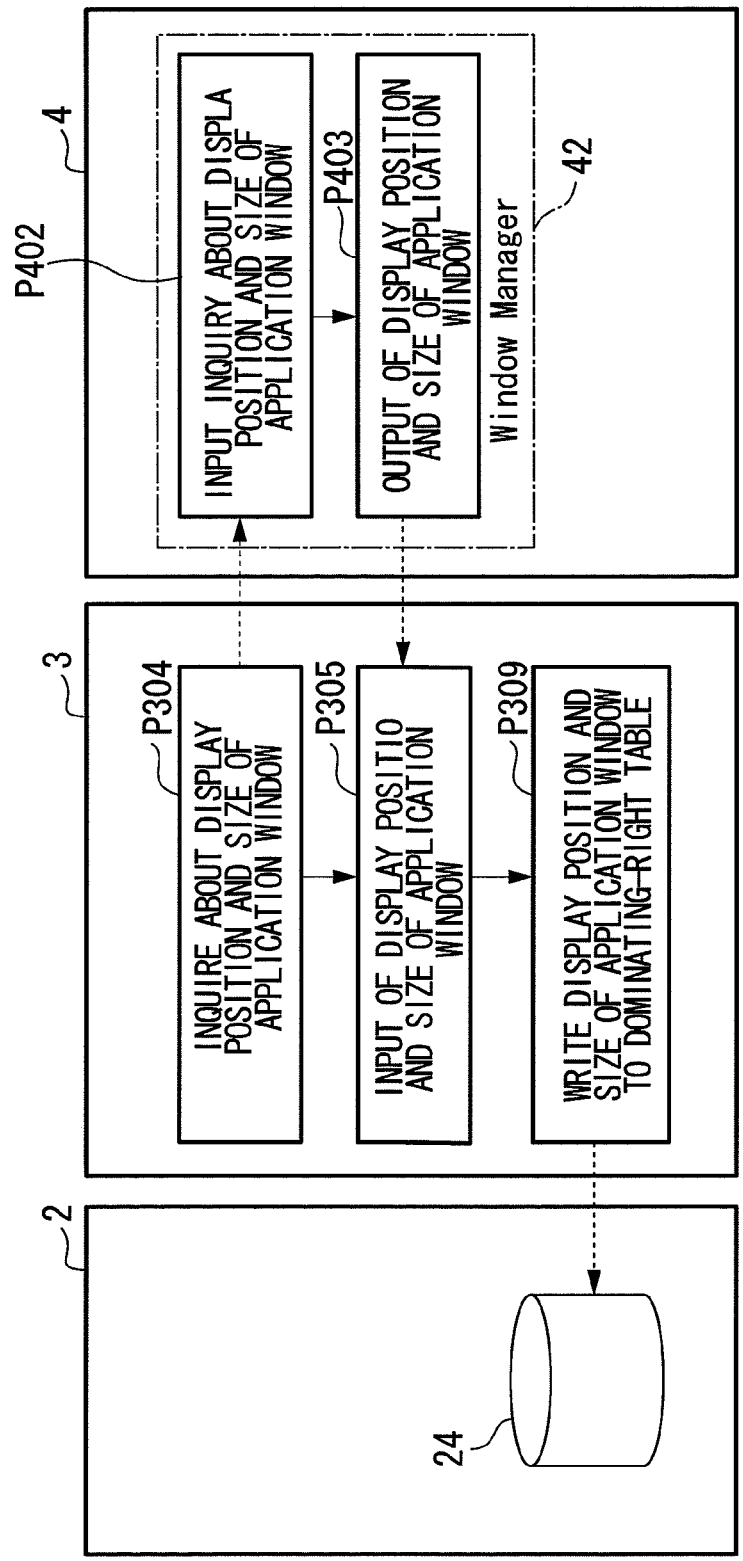
FIG. 16 is a drawing for explaining the working of the view manager in the case excluding application activation or termination.

Next, a process procedure about application state display of the display control device according to the present embodiment will be explained with reference to FIG. 11 to FIG. 16. FIG. 11, FIG. 15, and FIG. 16 are working flows for explaining the process procedure about the application state display. FIG. 12 is a drawing showing an example of the display screen of the display device 7. FIG. 13 is a drawing showing an example of the dominating-right table 24. FIG. 14 is a drawing showing an example of the pointer display coordinate table 25.

First, an operator carries out an operation with respect to the application while watching a window displayed on the display device 7. For example, when the operator moves a pointer to the location of the window and carries out an input instruction about the application, the input instruction information is input to the remote cursor 103 (P103 of FIG. 11). The remote cursor 103 attaches the identification information (for example, terminal No. 1) of the input operation device 1 to the input instruction information and outputs them to the multi cursor controller 21 provided in the first information processing terminal 2 (P104).

When the input instruction information of the application is input to the multi cursor controller 21 from the remote cursor 103 (P210), the multi cursor controller 21 determines whether the input instruction information is the information about activation or termination of an application or not (P211). When it is activation or termination of the application as a result, the process of FIG. 16 is carried out. Details of FIG. 16 will be described later.

On the other hand, when the input instruction information is not the information about activation or termination of the application, the multi cursor controller 21 references the dominating-right table 24 (P212) and determines which application is dominated by the terminal No. 1 (P213). For example, according to the dominating-right table 24 shown in FIG. 13, it can be understood that the terminal No. 1 has the right to dominate the application α. In this case, if the dominated application is not recorded, the input instruction information is ignored, and the process is terminated (P218).

Next, the multi cursor controller 21 obtains the information of the pointer A, which is currently controlled by the terminal No 1, from the dominating-right table 24 and obtains the current display coordinates of the pointer from the pointer display coordinate table 25. Furthermore, the multi cursor controller 21 obtains the application window coordinates and application window width associated with the terminal No 1 in the dominating-right table and, on the basis of the information, specifies the display coordinate range of the window of the application α(P214). Then, according to the display coordinates of the pointer A and the display coordinate range of the window of the application α, the multi cursor controller 21 determines whether the pointer A is displayed on the window of the application α or not (P215).

When the pointer is not on the window as a result, the input instruction information is ignored, and the process is terminated (P218). On the other hand, if the pointer is on the window, the input instruction information previously obtained from the remote cursor 103 is converted to the data format and interface specifications of the window system used by the application (P216) and output to the second information processing terminal 8 (P217). As a result, the change in the state of the window on the basis of the input instruction information is reflected to the display screen of the display device 7 (P401).

Next, the case of application activation or termination will be explained along with a process flow of FIG. 15. FIG. 15 is a drawing explaining the working of the view manager 3 upon application activation or termination. When the operation of the operation device 1 is determined to be application activation or termination in P211 of FIG. 11, the multi cursor controller 21 outputs the input instruction information to the view manager 3 (P219). The view manager 3 determines whether the input instruction information, which has been input, is application activation or termination (P301, P302).

As a result, in the case of the application activation, an activation order of a corresponding application is output to the display controlling unit 4 (P303). When the application program 41 is activated by the display controlling unit 4 as a result, the view manager 3 inquires the window manager 42 of the display controlling unit 4 about the display position and size of the application window thereof (P304). When the inquiry is input (P402), the window manager 42 outputs the display position and size of the application window to the view manager 3 (P403). When the display position and size of the application window are input (P305), the view manager 3 records the number of activated application, the display position and size of the application window, and the terminal No. 1 in the dominating-right table 24 of the first information processing terminal 2 in the manner that they are associated on each other (P306).

On the other hand, if the application termination is determined in the above described determination of P302, the view manager 3 outputs a termination order of the corresponding application to the display controlling unit 4 (P307). When the application program 41 is terminated by the display controlling unit 4 as a result, the view manager unit 3 deletes the application and the display position and size of the application window thereof from the dominating-right table of the first information processing terminal 2 (P308).

Next, working of the view manager 3 in the case in which the input instruction information input from the input operation device 1 is other than application activation or termination will be explained with reference to FIG. 16. FIG. 16 is a drawing for explaining working of the view manager 3 in the case excluding application activation or termination.

When a change is generated in the display position or size of a window and at a predetermined time interval, the view manager 3 carries out an inquiry about the position and size of the application window with respect to the window manager 42 of the display controlling unit 4 (P304). On the basis of the information of the position and size of the application window, the view manager 3 executes a process of updating the dominating-right table 24 of the first information processing terminal 2 (P305, P309).

Next, working of the display controlling device in the case in which a movement order of an application window displayed on the display device 7 is output from the input operation device 1 will be briefly explained.

In this case, the multi cursor controller 21 of the first information processing terminal 2 has a moving-right table (not shown) in which the identification information of the input operation devices 1, the pointer information, and the identification information of the applications for which the pointers have moving rights are associated with each other. When operation information about movement of a window is received from the remote cursor 103 of the input operation device 1, whether the input operation device has the moving right of the window of a corresponding application or not is determined by referencing the moving-right table.

When the device has the moving right of the window as a result, the identification information of the input operation unit, the identification information of the application, and the movement operation information of the window are associated with each other and are output to the second information processing terminal 8. As a result, when the device has the moving right, the window is moved on the display device 7 along with movement of the pointer thereof. For which application the movement is required is determined according to the fact that the pointer is displayed within the display area of the application window thereof or not.

The above described dominating right of the application can be obtained, for example, by moving the pointer onto the window of the application. The dominating right of the application is exclusively set. With respect to the application dominated by any of the input operation devices, operations about this application carried out by the other input operation devices are treated to be invalid.

Cancellation of the dominating right of the application is set to be realized when the pointer is moved to a location other than the application window thereof and a predetermined process is carried out. The obtainment and cancellation of the dominating right of the application can be arbitrarily set and changed.

The moving right of the application window is also exclusively set. However, the moving right of an application and the dominating right of the application do not have to belong to the same input operation device. In other words, the input operation device different from the input operation device having the dominating right of an application may have the moving right of the application. In such a case, for example, when an operator who is to activate a new application on the display screen of the display device 7 can move the application window(s) displayed on the displayed screen to a desired position(s) and then display an application window desired by the operator in the display screen.

As described above, according to the display control device and the control system according to the present embodiment, the first information processing terminal 2 which draws the pointers on the screen and the second information processing terminal 2 which draws the working states of the applications are provided. Therefore, pointer control display and application working state display can be realized by separate terminals. The ability of processing can be improved by dividing the processes about display and allocating them to separate processing units in this manner. Thus, prompt responsiveness and operability can be improved.

REFERENCE SIGNS LIST

1 INPUT OPERATION DEVICE
2 FIRST INFORMATION PROCESSING TERMINAL
3 VIEW MANAGER
4 DISPLAY CONTROLLING UNIT
5 DISPLAY PROCESSING UNIT
6 IMAGE SYNTHESIS UNIT
7 DISPLAY DEVICE
8 SECOND INFORMATION PROCESSING TERMINAL
9 NETWORK
10 POINTER SCREEN
11 APPLICATION SCREEN
21 MULTI CURSOR CONTROLLER
22 DRAWING UNIT
23 VIDEO CARD
24 DOMINATING-RIGHT TABLE
25 POINTER DISPLAY COORDINATE TABLE
41 APPLICATION PROGRAM
42 WINDOW MANAGER
51 DRAWING UNIT
52 VIDEO CARD
101 KEYBOARD
102 POINTING DEVICE
103 REMOTE CURSOR

The invention claimed is:

1. A display control system connected to a plurality of input operation units via a network and adapted for moving a pointer displayed on a display unit on the basis of an operation quantity input from the input operation units and changing a working state of an application displayed on the display unit in accordance with input instruction information input from the input operation units, the display control system comprising:

a first processing unit having a first computer and a pointer screen corresponding to a display region of the display unit, the first processing unit drawing the pointer corresponding to each of the input operation units on the pointer screen on the basis of the operation quantity input from each of the input operation units;

a second processing unit having a second computer different from the first computer and an application screen corresponding to the display region of the display unit, the second processing unit drawing the working state of the application on the application screen in accordance with the input instruction information input from each of the input operation units; and an image synthesis unit that creates a synthesized image in which the pointer screen on which the pointer is drawn and the application screen on which the working state of the application is drawn are superimposed on each other and that outputs the synthesized image to the display unit, wherein:

the first processing unit has a dominating-right table in which identification information of the input operation unit and identification information of the application for which the input operation unit has a dominating right are associated with each other;

when the input instruction information about the application is received from the input operation unit, whether the input operation unit has the dominating right of the application or not is determined by referencing the dominating-right table, and, if the input operation unit has the dominating right, the identification information of the input operation unit, the identification information of the application, and the input instruction information about the application are associated with each other and are output to the second processing unit; and the input instruction information is converted to a data format and an interface specification of a window system used by the application when the pointer is on a window of the application, and the input instruction information is ignored when the pointer is not on the window of the application.

2. The display control device according to claim 1, wherein the first processing unit has a moving-right table in which the identification information of the input operation unit and the identification information of the application for which the input operation unit has a moving right of a window are associated with each other; and, when operation information about movement of the window is received from the input operation unit, whether the input operation unit has the moving right of the window of the application or not is determined by referencing the moving-right table, and, if the input operation unit has the moving right of the window, the identification information of the input operation unit, the identification information of the application, and the movement operation information of the window are associated with each other and are output to the second processing unit.

3. The display control device according to claim 2, wherein the input operation unit different from the input operation unit having the dominating right of the application can acquire the moving right of the window of the application.

4. The display control device according to claim 1, wherein the first processing unit has a moving-right table in which the identification information of the input operation unit and the identification information of the application for which the input operation unit has a moving right of a window are associated with each other; and, when operation information about movement of the window is received from the input operation unit, whether the input operation unit has the moving right of the window of the application or not is determined by referencing the moving-right table, and, if the input operation unit has the moving right of the window, the identification information of the input operation unit, the identification information of the application, and the movement operation information of the window are associated with each other and are output to the second processing unit.

5. The display control device according to claim 4, wherein the input operation unit different from the input operation unit having the dominating right of the application can acquire the moving right of the window of the application.

6. The display control device according to claim 4, wherein each of the pointer screen and the application screen has a coordinate size established by a maximum x value and a maximum y value, and the coordinate size of the pointer screen is the same as the coordinate size of the application screen, and wherein the image synthesis unit superimposes the pointer screen and the application screen on each other with the coordinates of the pointer screen at the same position as matching coordinates of the application screen.

7. The display control device according to claim 1, wherein each of the pointer screen and the application screen has a coordinate size established by a maximum x value and a maximum y value, and the coordinate size of the pointer screen is the same as the coordinate size of the application screen, and wherein the image synthesis unit superimposes the pointer screen and the application screen on each other with the coordinates of the pointer screen at the same position as matching coordinates of the application screen.

8. A control system comprising:
a plurality of input operation units;
the display control device according to claim 1 connected to the plurality of input operation units via a network; and
a display unit displaying an image signal output from the display control device.

9. A control system comprising:
a plurality of input operation units;
the display control device according to claim 1 connected to the plurality of input operation units via a network; and
a display unit displaying an image signal output from the display control device.

10. A control system comprising:
a plurality of input operation units;
the display control device according to claim 2 connected to the plurality of input operation units via a network; and
a display unit displaying an image signal output from the display control device.

11. A control system comprising:
a plurality of input operation units;
the display control device according to claim 3 connected to the plurality of input operation units via a network; and
a display unit displaying an image signal output from the display control device.

12. A control system comprising:
a plurality of input operation units;
the display control device according to claim 4 connected to the plurality of input operation units via a network; and
a display unit displaying an image signal output from the display control device.

13. The control system of claim 12, wherein each of the pointer screen and the application screen has a coordinate size established by a maximum x value and a maximum y value, and the coordinate size of the pointer screen is the same as the coordinate size of the application screen, and wherein the image synthesis unit superimposes the pointer screen and the application screen on each other with the coordinates of the pointer screen at the same position as matching coordinates of the application screen.

14. A control system comprising:
a plurality of input operation units;
the display control device according to claim 5 connected to the plurality of input operation units via a network; and
a display unit displaying an image signal output from the display control device.

* * * * *

UNITED STATES PATENT AND TRADEMARK OFFICE
CERTIFICATE OF CORRECTION

PATENT NO. : 8,994,655 B2  
APPLICATION NO. : 13/053475  
DATED : March 31, 2015  
INVENTOR(S) : Munehiro Komeda Page 1 of 1

It is certified that error appears in the above-identified patent and that said Letters Patent is hereby corrected as shown below:

On the Title Page

Item (73), Assignee, "Mitsubishi Heavy Industries, Ltd., Tokyo (JP)" should read --Mitsubishi Heavy Industries, Ltd., Tokyo (JP); NEC Corporation, Tokyo (JP)--.

Signed and Sealed this  
Twenty-fourth Day of May, 2016

Michelle K. Lee  
*Director of the United States Patent and Trademark Office*